US010211669B1

(12) United States Patent
Wildstone et al.

(10) Patent No.: US 10,211,669 B1
(45) Date of Patent: Feb. 19, 2019

(54) AUTOMATIC TRANSFER SWITCH BYPASS DEVICE

(71) Applicant: Amazon Technologies, Inc., Reno, NV (US)

(72) Inventors: Kelsey Michelle Wildstone, Seattle, WA (US); Peter George Ross, Olympia, WA (US); Yuan Kong, Kirkland, WA (US); Robin McCulloch, Mornington (IE); Richard Arvel Stevens, Auburn, WA (US)

(73) Assignee: Amazon Technologies, Inc., Reno, NV (US)

( * ) Notice: Subject to any disclaimer, the term of this patent is extended or adjusted under 35 U.S.C. 154(b) by 833 days.

(21) Appl. No.: 14/611,959

(22) Filed: Feb. 2, 2015

Related U.S. Application Data

(60) Provisional application No. 62/085,152, filed on Nov. 26, 2014.

(51) Int. Cl.
*H02J 1/10* (2006.01)
*H02J 9/06* (2006.01)
*H01H 9/26* (2006.01)

(52) U.S. Cl.
CPC .............. *H02J 9/061* (2013.01); *H01H 9/26* (2013.01)

(58) Field of Classification Search
CPC .................................. H02J 9/061; H01H 9/26
USPC ........................................................ 307/29
See application file for complete search history.

(56) References Cited

U.S. PATENT DOCUMENTS

| 8,144,442 | B1 * | 3/2012 | Heath | H02H 7/267 361/62 |
|---|---|---|---|---|
| 9,081,568 | B1 * | 7/2015 | Ross | G06F 1/3203 |
| 2015/0123473 | A1 * | 5/2015 | Braylovskiy | H02J 9/061 307/23 |
| 2015/0180275 | A1 * | 6/2015 | Tomassi | H02J 9/06 307/64 |

OTHER PUBLICATIONS

Emerson Network Power, "ASCO 7000 Series Power Transfer Switches", Publication 3040 R14, 2014, pp. 1-28, USA.
Ge, "ZBTE Low-Voltage Bypass/Isolation Open Transition Automatic and Manual Transfer Switches", 2011, pp. 1-2, Chicago, Illinois USA.
www.eaton.com, "Transfer Switches", Commercial Distribution, Apr. 2014, pp. V2-T5-1-V2-T5-11, vol. 2.

* cited by examiner

*Primary Examiner* — Richard Tan
(74) *Attorney, Agent, or Firm* — Robert C. Kowert; Meyertons, Hood, Kivlin, Kowert & Goetzel, P.C.

(57) ABSTRACT

A bypass device is used to bypass one or more automatic transfer switches mounted in an automatic transfer switch cabinet. The bypass device is physically coupled to one or more input power sources and to each respective output connection of a plurality of automatic transfer switches in the automatic transfer switch cabinet. The bypass device selectively feeds electrical power to one or more loads associated with a limited selection of automatic transfer switches to be bypassed. The bypass device comprises a selector device configured to route power from an input power source to respective output connections of the limited selection of automatic transfer switches to be bypassed. A plurality of output breakers are coupled to separate power outlets of each of the plurality of automatic transfer switches to isolate the respective automatic transfer switches.

21 Claims, 10 Drawing Sheets

AUTOMATIC TRANSFER SWITCH BYPASS DEVICE

This application claims benefit of priority of U.S. Provisional Application Ser. No. 62/085,152 entitled "AUTOMATIC TRANSFER SWITCH BYPASS DEVICE" filed Nov. 26, 2014, the content of which is incorporated by reference herein in its entirety.

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many computing racks, which may include server racks. Each computing rack, in turn, may include many computer systems, servers, associated computer equipment, etc.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 208V). A network of cabling, bus bars, power connectors, and power distribution units, is used to deliver the power at the lower voltage to numerous specific components in the facility.

Some data centers have limited redundancy in power systems. Some data centers have redundant systems but the redundant systems rely on non-redundant components to switch between the redundant systems. The down-time associated with power failures and maintenance of power systems in a data center may result in a significant loss in computing resources. In some critical systems such as hospital equipment and security systems, down-time may result in significant disruption and, in some cases, adversely affect health and safety.

In some systems, an automatic transfer switch ("ATS") provides switching from a primary power system to a secondary (e.g., back-up) power system. In a typical system, the automatic transfer switch automatically switches a computing rack to the secondary system upon detecting a fault in the primary power. To maintain the computing equipment in continuous operation, the automatic transfer switch may need to make the transfer to a secondary power system rapidly (for example, within about 16 milliseconds).

Some data centers rely on a single ATS to switch between primary and secondary power systems. In some data centers an ATS may feed electrical power from a primary power system the majority of the time the ATS is in operation and infrequently swap to feed electrical power from a secondary power system.

As a result, ATSs may disproportionately fail when switching from a primary power system to a secondary power system, thereby causing a loss of electrical power to the loads supported by the ATS. In addition, in order to ensure ATSs are in good repair and likely to function when needed, periodic maintenance may be performed on ATSs. Such failures and maintenance may further require extended computing unit downtime and may require temporarily taking otherwise unrelated systems and components offline, thereby exacerbating costs.

Figure 1:
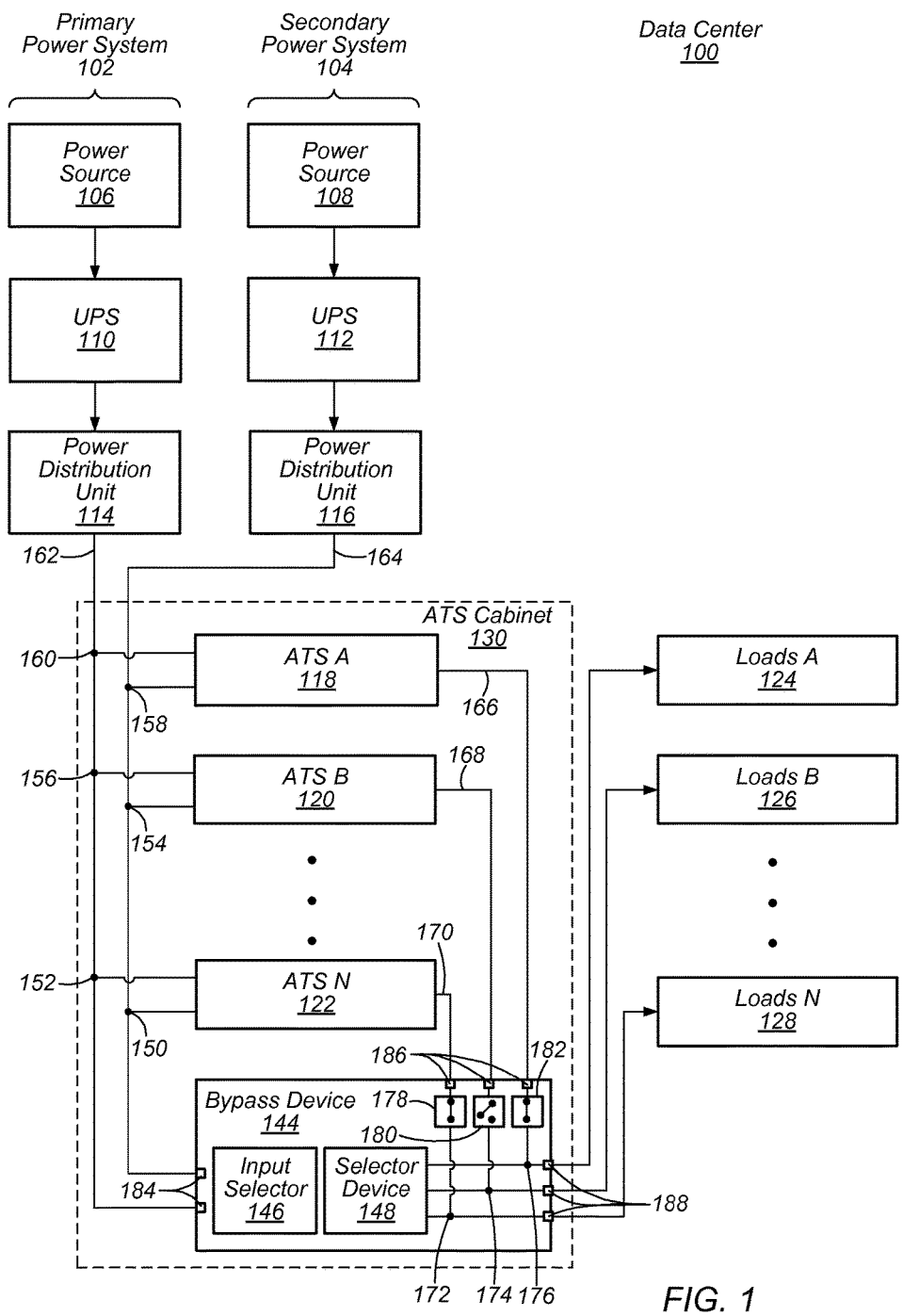
FIG. 1 is a schematic illustrating a data center that includes separate power systems feeding an automatic transfer switch cabinet that comprises a bypass device, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of bypass devices and automatic transfer switch cabinets comprising bypass devices are disclosed. According to one embodiment, a data center includes an automatic transfer switch cabinet that includes a plurality of automatic transfer switches that are configured to selectively feed electrical power from one of two or more input power sources to one or more loads in the data center via respective output connections of each automatic transfer switch. A bypass device is physically coupled to at least one or more input power sources, for example a primary power source and a secondary power source. The bypass device is physically coupled to respective output connections of each of two or more automatic transfer switches. The bypass device is configured to selectively feed electrical power to one or more loads in a data center that are associated with a limited selection of automatic transfer switches to be bypassed via an electrical bypass of the limited selection of automatic transfer switches, wherein the limited selection comprises less than all the automatic transfer switches in the automatic transfer switch cabinet. The bypass device includes a selector device configured to selectively route power from at least one of the two or more input power sources to respective output connections of a limited selection of automatic transfer switches of the two or more automatic transfer switches. Respective ones of a plurality of output breakers are coupled to separate power outlets of each of the two or more automatic transfer switches. The output breakers are configured to selectively electrically isolate a respective automatic transfer switch from the respective output connection.

According to one embodiment, a bypass device includes a plurality of automatic transfer switch connectors configured to electrically couple the bypass device to respective outputs of each of a plurality of automatic transfer switches, wherein each automatic transfer switch of the plurality of automatic transfer switches is configured to selectively feed electrical power from one of a plurality of input feeds to one or more loads via an output connection of the bypass device. The bypass device includes at least one input connector configured to electrically couple the bypass device to at least one input power source. And, the bypass device includes a plurality of output connectors configured to electrically couple respective output connections of the bypass device to the one or more loads. For example, an output connection within the bypass device may be connected to an output connector via a wire connection, and the same output connection may also be connected to an automatic transfer switch connector via a separate wire so that the output connection can route electrical power from an automatic transfer switch connected to the automatic transfer switch connector to one or more loads via the automatic transfer switch connector of the bypass device, the output connection of the bypass device, and the output connector of the bypass device that is coupled to the one or more loads. The bypass device comprises a selector device configured to selectively route power from the at least one input power source to respective output connections associated with a limited selection of automatic transfer switches to be bypassed of the plurality of automatic transfer switches. For example, a selector device of a bypass device may route electrical power from an input power source to an output connection that is electrically coupled to both an automatic transfer switch connector and an output connector. To bypass the limited selection of automatic transfer switches, the bypass device is configured to route power from the at least one input power source to the respective output connections associated with the limited selection of automatic transfer switches to be bypassed. And, the bypass device is configured to electrically isolate the limited selection of automatic transfer switches to be bypassed. The bypass device is configured to bypass the limited selection of automatic transfer switches from a front side of the bypass device.

According to one embodiment, a method includes selecting, via a selector device of a bypass device, one or more automatic transfer switches to bypass of a plurality of automatic transfer switches, wherein the bypass device is physically coupled to at least one input power source and physically coupled to respective outlets of each respective automatic transfer switch of the plurality of automatic transfer switches via respective output connections of the bypass device. The method includes selecting, via an input selector of the bypass device, an input power source of the at least one input power source to feed electrical power to one or more respective output connections of the bypass device associated with the one or more automatic transfer switches selected to be bypassed. And, isolating, via an isolation interface of the bypass device, the one or more automatic transfer switches selected to be bypassed.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "power distribution unit", also referred to herein as a "PDU", means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.).

As used herein, "primary power" means any power that can be supplied to an electrical load, for example, during normal operating conditions. A power distribution system (also referred to herein as a "power system") that distributes primary power may be referred to as a primary power system.

As used herein, "physically coupled" refers to a connection that physically connects two or more components and is configured to electrically couple and electrically isolate the two or more components. For example, two wires are physically coupled via a switch. And, the switch is configured to electrically couple and electrically isolate the two wires by closing and opening the switch.

As used herein, "secondary power" means power that can be supplied to an electrical load upon the failure of, or as a substitute for, primary power to the load. A power distribution system (also referred to herein as a "power system") that distributes reserve power may be referred to as a secondary power system.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

FIG. 1 is a schematic illustrating a data center that includes separate power systems feeding an automatic transfer switch cabinet that comprises a bypass device, according to some embodiments. An automatic transfer switch selectively feeds electrical power from two or more power sources to loads associated with the automatic transfer switch. An automatic transfer switch may be configured to detect an interruption in power supplied from a power source used to feed loads associated with the automatic transfer switch and automatically switch to feeding the loads associated with the automatic transfer switch from a secondary power source. For example, data center 100 includes automatic transfer switches 118, 120, and 122 that feed loads 124, 126, and 128. Loads, such as loads 124, 126, and 128 may comprise one or more computer systems and related equipment in a data center, such as data center 100. Loads, such as loads 124, 126, and 128 may also include auxiliary equipment associated with an automatic transfer switch cabinet including, fans, network hubs, and the like.

An automatic transfer switch cabinet may comprise multiple automatic transfer switches mounted in the cabinet. In FIG. 1, automatic transfer switch cabinet 130 is depicted with three automatic transfer switches mounted in automatic transfer switch cabinet 130. However, in some embodiments, an automatic transfer switch cabinet may comprise more or less automatic transfer switches mounted in the cabinet. For example, the ellipses between automatic transfer switch 120 and automatic transfer switch 122, and the labels, ATS "A", ATS "B", and ATS "N" represent that automatic transfer switch cabinet 130 may comprise more or less automatic transfer switches. Likewise, the ellipses between loads 126 and 128, and the labels, Loads "A", Loads "B", and Loads "N" represent that more or less loads may be included in data center 100, each associated with a respective automatic transfer switch. Also, the labels are to indicate that Loads "A" are associated with ATS "A", Loads "B" are associated with ATS "B", and Loads "N" are associated with ATS "N", and so on.

In some data centers, automatic transfer switches may route electrical power to loads associated with automatic transfer switches from a primary power source the vast majority of the time electrical power is being routed via the automatic transfer switch. Long periods of time may pass between events that cause a loss of power that results in an automatic transfer switch switching from a primary power source to a secondary power source. Due to the infrequent occurrence of switching from primary power to secondary power and the extended periods of time between occurrences of switching, aging of components of automatic transfer switches may go unnoticed until a switching event occurs. For example, a contactor for a secondary power input of an automatic transfer switch may corrode over an extended period of not being used while an automatic transfer switch is feeding loads from a primary power source. The corrosion of the contactor may only become apparent when a loss of primary power occurs and the automatic transfer switch fails to switch over to feed electrical power from a secondary power source. The corrosion of the contactor and resulting failure of the automatic transfer switch to switch to the secondary power source may result in a loss of power feed to the loads associated with the automatic transfer switch. A loss of power to loads in a data center may cause customer interruptions and loss of business. Therefore, minimization of the amount of time power is lost due to a failed automatic transfer switch is imperative.

In order to improve reliability of automatic transfer switches, some data centers may implement a preventative maintenance program to proactively remove automatic transfer switches from service for inspection and maintenance. In order to perform preventative maintenance without interrupting the flow of electrical power to one or more loads associated with an automatic transfer switch, a method is needed to bypass an automatic transfer switch so that electrical power continues to flow to one or more loads associated with an automatic transfer switch, while the automatic transfer switch is removed for inspection and maintenance.

In some data centers, removing an automatic transfer switch from an automatic transfer switch cabinet may require personnel to interact with a backside of the automatic transfer switch to disconnect connections to the automatic transfer switch or to isolate the automatic transfer switch. In some data centers, an automatic transfer switch cabinet may be oriented so that the back side of the automatic transfer switch cabinet faces a hot aisle that receives exhaust air from other air cooled electrical equipment in the data center. In some data centers, connections and switches for isolating and removing an automatic transfer switch may be located in different places in the data center. Removing an automatic transfer switch may require interacting with the different connections in switches spread out across the data center. And, the decentralized process of interacting with the separately located connections and switches may lead to errors when removing an automatic transfer switch from an automatic transfer switch cabinet. For example, a data center technician may make an error determining which switch corresponds with an automatic transfer switch to be removed, when the switch and the automatic transfer switch are not located in the same location.

A bypass device, such as bypass device 144, may be used to quickly respond to a failed automatic transfer switch and also may be used to bypass an automatic transfer switch while maintenance is performed on the automatic transfer switch without interrupting the flow of electrical power to the loads associated with the automatic transfer switch. A bypass device, such as bypass device 144, may be used for other purposes including testing automatic transfer switches, upgrading automatic transfer switches, installing automatic transfer switches, and the like. A bypass device, such as bypass device 144, may allow an automatic transfer switch to be removed from the front of an automatic transfer switch cabinet by interacting with the front of the bypass device mounted in an automatic transfer switch cabinet along with the automatic transfer switch. An automatic transfer switch may be bypassed isolated, and removed all from the front of an automatic transfer switch cabinet, without interacting with a back side of the automatic transfer switch cabinet or interacting with other connections and switches in other locations. A bypass device, such as bypass device 144, may include an input selector and a selector device, such as input selector 146 and selector device 148. A bypass device may also include respective output breakers that are each coupled to a connection to respective output connections of automatic transfer switches. The input selector, selector device, and output breakers may all be located on a front side of the bypass device. For example, output breaker 178 is coupled upstream of the output connection 172 of the outlet 170 of ATS "N" 122. Output breaker 180 is coupled upstream of the output connection 174 of the outlet 168 of ATS "B" 120. Output breaker 182 is coupled upstream of the output connection 176 of the outlet 166 of ATS "A" 118. In some embodiments, a bypass device may not include output breakers, such as output breakers 178, 180, and 182.

A bypass device, such as bypass device 144, may be physically coupled to a primary power system and a secondary power system via input connectors and an input selector such as input connectors 184, input selector 146 and primary power system 102 and secondary power system 104. The primary power system and secondary power system physically coupled to the bypass device may be feeding electrical power to loads via one or more automatic transfer switches mounted in an automatic transfer switch cabinet along with the bypass device. For example, in FIG. 1 primary power system 102 is physically coupled to bypass device 144 via input connectors 184 and input selector 146. Primary power system 102 is also coupled to ATS "A" 118 via connection 160, ATS "B" 120 via connection 156 and ATS "N" via connection 152. In FIG. 1, secondary power system 104 is also physically coupled to bypass device 144 via input connectors 184 and input selector 146. Secondary power system 104 is also coupled to ATS "A" 118 via connection 158, ATS "B" 120 via connection 154, and ATS "N" 122 via connection 150.

A bypass device, such as bypass device 144 may include a selector device for selecting an automatic transfer switch to bypass, such as selector device 148. The selector device may be configured to couple an outlet of the input selector to a respective output connection of an automatic transfer switch. For example, selector device 148 may be configured to couple an outlet from input selector 146 to one or more of output connection 176 on the outlet of ATS "A" 118, output connection 174 on the outlet of ATS "B" 120, and output connection 172 on the outlet of ATS "N" 122. In some embodiments, a selector device may be a rotary switch that selectively couples the outlet of an input selector to one of a plurality of ATS output connections coupled to a bypass device. In some embodiments, a selector device may comprise an array of switches that can be operated to selectively electrically couple an outlet of an input selector to one or more output connections of a plurality of ATS output connections. In some embodiments a selector device may comprise a user interface and one or more processors may command switching mechanisms to couple an outlet of an input selector of a bypass device to one or more output connections of a plurality of ATS output connections. The output connections of a bypass device may be coupled to respective outlets of automatic transfer switches via automatic transfer switch connectors. For example, in FIG. 1, output connections 172 is coupled to outlet 170 of ATS "N" 122 via automatic transfer switch connectors 186, output connection 180 is coupled to outlet 168 of ATS "B" 120 via automatic transfer switch connectors 186, and out connection 182 is coupled to outlet 166 of ATS "A" 118 via automatic transfer switch connectors 186.

Once an outlet of an input selector is aligned to an output connection of an ATS that is to be bypassed, an input selector, such as input selector 146, may be used to select a power source to be used for providing electrical power to loads associated with the automatic transfer switch to be bypassed. For example, it may be determined that ATS "B" 120 is feeding electrical power to loads "B" 126 from primary power system 102. In order to bypass ATS "B" 120, selector device 148 may be rotated so that the outlet of input selector 146 is electrically coupled to output connection 174 of ATS "B" 120. In some embodiments, an output breaker, such as breaker 180, may be coupled to the outlet of an automatic transfer switch connector, such as automatic transfer switch connector 186 coupled to ATS "B" 120, between the automatic transfer switch and a respective ATS output connection, such as ATS output connection 174. In some embodiments, a bypass device such as bypass device 144, may not include an output breaker, such as breaker 180.

In order to select a power source for bypassing a particular ATS, the power source currently feeding the ATS to be bypassed may be determined. For example, if bypassing ATS "B" 120 it may be determined that ATS "B" 120 is currently feeding electrical power from primary power system 102. Based on the determined power source currently feeding the particular automatic transfer switch to be bypassed, the same power source may be selected via the input selector to be used for bypassing the particular automatic transfer switch. For example, input selector 146 may be operated to select to feed bypass device 144 with electrical power from primary power system 102 based on determining that ATS "B" 120 that is to be bypassed is currently feeding electrical power from primary power system 102.

Once, a selector device, such as selector device 148, is aligned to an output connection associated with a particular automatic transfer switch to be bypassed, such as ATS "B" 120, and an input selector, such as input selector 146, is aligned to feed electrical power from a selected input power source to the selector device, a bypass circuit is completed and electrical power flows from the selected power source through the input selector, through the selector device and to the output connection that is electrically coupled to one or more loads that are associated with the automatic transfer switch that is to be bypassed. The output connection may be coupled to the one or more loads via an output connection, such as output connectors 188. An output breaker, such as output breaker 178 of bypass device 144, may be opened to break the circuit path to the loads via the automatic transfer switch to be bypassed, while electrical power continues to flow to the one or more loads associated with the automatic transfer switch to be bypassed via the bypass device, such as bypass device 144. For example, in FIG. 1 output breaker 180 is open, thus electrical power is not flowing to loads "B" 126 via ATS "B" 120, but instead flows from input power connection 152 of primary power system 102 to input selector 146 to selector device 148, which is electrically coupled to loads "B" 126 and output connection 174.

In some embodiments, a bypass device may receive electrical power from a power source independent of the power sources that are coupled to automatic transfer switches that the bypass device is configured to bypass. For example, bypass device 144 may receive input power from an additional power source (not shown) that is independent of primary power system 102 and secondary power system 104.

In some embodiments, automatic transfer switches, such as ATS "A" 118, ATS "B" 120, and ATS "N" 122, may include blind mate connections. The blind mate connections may allow an automatic transfer switch to be removed from an automatic transfer switch cabinet while electrically coupled to one or more loads. The blind mate connection may isolate an automatic transfer switch in a similar way that a standard electrical plug isolates a home appliance (e.g. an automatic transfer switch may be isolated by removing the automatic transfer switch from an automatic transfer switch cabinet and the blind made connection may operate to unplug the automatic transfer switch as it is removed from an automatic transfer switch cabinet). For example, in an embodiment that does not include output breakers 178, 180, and 182, once a selector device, such as selector device 148 is aligned to bypass a particular automatic transfer switch, such as ATS "B" 120, and an input selector, such as input selector 146, is aligned to feed electrical power from an input power source, an electrical circuit to loads associated with the automatic transfer switch to be bypassed is formed via the bypass device while the original circuit to the loads via the automatic transfer switch to be bypassed remains. In embodiments without output breakers, breaking a blind mate connection of the automatic transfer switch to be bypassed may isolate the removed automatic transfer switch. For example, removing ATS "B" 120 from ATS cabinet 130 would break the circuit from input connections 154 and 156 to loads "B" 126 so that ATS "B" 120 is isolated. In some embodiments automatic transfer switches may include blind mate connections and a bypass device may also include output breakers. In some embodiments, other well-known techniques may be used to isolate an automatic transfer switch.

In some embodiments, a bypass device, such as bypass device 144, may include signal connectors that are configured to send a signal to latches in an automatic transfer switch cabinet, such as ATS cabinet 130 to indicate that an automatic transfer switch is currently being bypassed. For example, a latch of an ATS cabinet may hold an automatic transfer switch in a slot in an automatic transfer switch and prevent an automatic transfer switch, such as a blind mate automatic transfer switch, to be removed from the ATS cabinet. The latch may be configured to release upon receiving a signal from a bypass device indicating that the automatic transfer switch is currently being bypassed. This may prevent inadvertent removal of a non-bypassed automatic transfer switch.

In the embodiment depicted in FIG. 1, automatic transfer switches (ATSs) 118, 120, and 122 receive electrical power from primary power system 102 and secondary power system 104. Primary power system 102 includes power source 106, uninterruptible power supply 110, and power distribution unit 114. Power source 106 may be a utility power source, a solar power source, a wind generated power source, or any other source capable of providing electrical power to data center 100. An uninterruptible power supply, such as uninterruptible power supply (UPS) 110, may include one or more batteries configured to provide a consistent flow of electrical power to ATSs 118, 120, and 122. A power distribution unit, such as power distribution unit (PDU) 114, receives electrical power from UPS 110 and distributes electrical power to ATSs, such as ATSs 118, 120, and 122. In some embodiments, a power distribution unit may include one or more transformers to step down a voltage of electrical power received from a UPS, such as UPS 110 to a low voltage suitable for transmission to loads, such as loads 124, 126, and 128. In some embodiments, a primary power system may comprise additional components. In some embodiments a primary power system may not include an uninterruptible power supply, a power distribution unit, or both.

In the example illustrated in FIG. 1, secondary power system 104 includes power source 108, uninterruptible power supply (UPS) 112, and power distribution unit (PDU) 116. A secondary power system may include a second utility power feed that is independent of a utility power feed that supplies a primary power system. For example, power source 108 of secondary power system 104 may be a utility power feed independent of power source 106 of primary power system 102. In some embodiments a power source for a secondary power system, such as power source 108, may be a backup generator or other like reserve power source.

In some embodiments, an automatic transfer switch cabinet, such as ATS cabinet 130 may include slots configured to accept automatic transfer switches. For example, ATS "A" 118, ATS "B" 120 and ATS "N" 122 may be mounted in separate slots of ATS cabinet 130. A bypass device, such as bypass device 144, may be coupled to the outlet of each slot of an automatic transfer switch cabinet. For example, bypass device 144 is coupled to outlet 166 of ATS "A" 118. Bypass device 144 is also coupled to outlet 168 of ATS "B" 120. Bypass device 144 is also coupled to outlet 170 of ATS "N" 122. An automatic transfer switch cabinet may comprise some slots that are filled with automatic transfer switches feeding electrical power to associated loads and may comprise one or more slots that are empty and do not include an automatic transfer switch. An empty slot may not have one or more loads associated with the empty slot, or an empty slot may have one or more loads associated with the empty slot that are receiving electrical power being fed to the associated loads via a bypass device, such as bypass device 144.

For example, ATS "A" 118, ATS "B" 120, and ATS "N" 122 may all be feeding electrical power to loads "A" 124, loads "B" 126, and loads "N" 128 respectively. ATS "B" 120 may be removed from its slot in ATS cabinet 130 while electrical power is being fed to load "A" 124 via ATS "A" 118, loads "N" 128 via ATS "N" 122 and to loads "B" 126 via bypass device 144.

In some embodiments, a bypass device, such as bypass device 144, may be used to bypass more than one automatic transfer switch at a time. For example, bypass device 144 may be used to bypass ATS "A" 118 and ATS "B" 120 at the same time.

Figure 2:
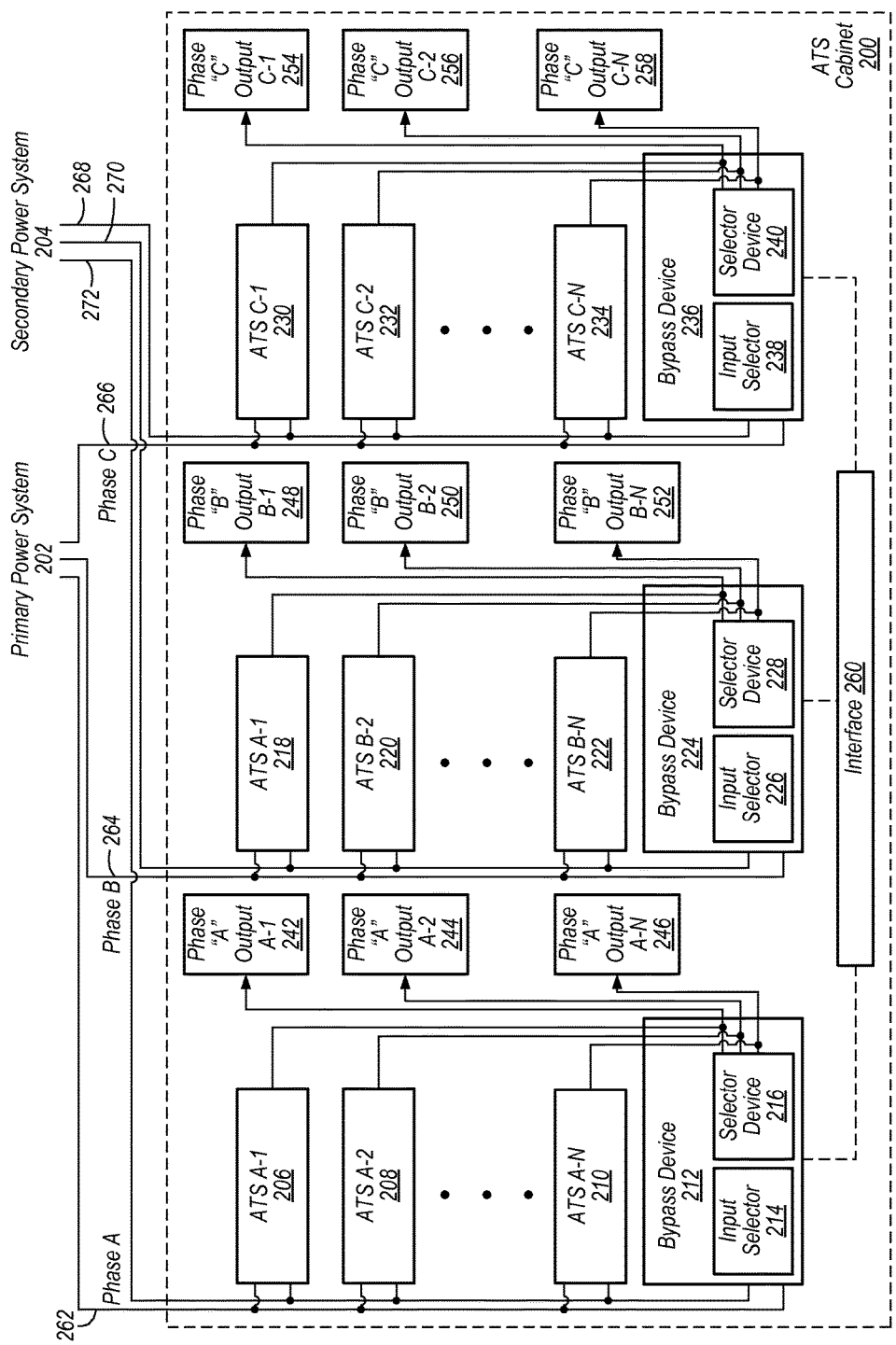
FIG. 2 is a schematic illustrating an automatic transfer switch cabinet with separate sets of automatic transfer switches and bypass devices receiving different phases of electrical power according to some embodiments.

FIG. 2 is a schematic illustrating an automatic transfer switch cabinet with separate sets of automatic transfer switches and bypass devices receiving different phases of electrical power according to some embodiments. An automatic transfer switch cabinet may include sets of automatic transfer switches with an associated bypass device where each set of automatic transfer switches and its associated bypass device receive electrical power of a particular phase that is different from other sets of automatic transfer switches and their associated bypass devices. For example, ATS cabinet 200 includes ATS "A-1" 206, ATS "A-2" 208, ATS "A-N" 210, and bypass device 212 that receive electrical power of phase "A" via phase "A" input power line 262 from primary power system 202 and phase "A" input power line 272 from secondary power system 204. ATS cabinet 200 also includes ATS "B-1" 218, ATS "B-2" 220, ATS "B-N" 222, and bypass device 224 that receive electrical power of phase "B" via phase "B" input power line 264 from primary power system 202 and via phase "B" input power line 270 from secondary power system 204. ATS cabinet 200 also includes ATS "C-1" 230, ATS "C-2" 232, ATS "C-N" 234, and bypass device 236 that receive electrical power of phase "C" from phase "C" input power line 266 from primary power system 202 and via phase "C" input power line 268 from secondary power system 204.

A bypass device, such as bypass devices 212, 224, and 236, may be associated with ATSs that all feed electrical power of the same phase. Thus different ATSs that feed electrical power at different phases can be bypassed at the same time via separate bypass devices. For example, ATS "A-2" may be bypassed at the same time as ATS "B-1." In this example, electrical power of phase "A" may be routed to phase "A" output "A-2" 244 via bypass device 212, while electrical power of phase "B" may be routed to phase "B" output "B-1" 248 via bypass device 224. In some embodiments any combination of: phase "A" outputs "A-1" 242, "A-2" 244, "A-N" 246, phase "B" outputs "B-1" 248, "B-2" 250, "B-N" 252, and phase "C" outputs "C-1" 254, "C-2" 256, and "C-N" 258 may be supplied with electrical power via respective bypass devices 212, 224, and 236 concurrently. For example bypass device 212 may be used to bypass ATS "A-1" 206 and ATS "A-2" 208 while bypass device 224 is used to bypass ATS "B-N" 222.

Bypass devices 212, 224, and 236 may operate in a similar manner as bypass device 144 described in FIG. 1. Primary power system 202 and secondary power system 204 may comprise similar components as primary power system 102 and secondary power system 104 described in FIG. 1. In some embodiments bypass devices 212, 224, and 236 may comprise output breakers such as output breakers 178, 180, and 182 described in FIG. 1.

In some embodiments, ATS cabinet 200 may include an interface, such as interface 260, for receiving indications of ATSs mounted in ATS cabinet 200 that are to be bypassed. An interface, such as interface 260, may be communicatively coupled to bypass devices and each bypass device's respective input selector and selector device. In some embodiments, an interface may be communicatively coupled via a wired connection and in some embodiments, an interface may be communicatively coupled via a network or a wireless connection. For example, in FIG. 2, interface 260 is communicatively coupled to input selector 214 and selector device 216 of bypass device 212, communicatively coupled to input selector 226 and selector device 228 of bypass device 224, and communicatively coupled to input selector 238 and selector device 240 of bypass device 236. In some embodiments, an interface, such as interface 260, may receive inputs via an interface mounted on a front side of a bypass device. For example an interface mounted on a front side of a bypass device may include a key pad that can be used to enter commands, such as an identifier of an automatic transfer switch to bypass; a touch pad used to enter commands; a touch-sensitive display used to enter commands; or any other well-known interface for entering commands. In some embodiments, a bypass device may receive commands via a network connection without the bypass device including a user interface. In some embodiments, a bypass device may be configured to directly receive an indication from an ATS that the ATS needs to be bypassed. For example, a bypass device may be configured to electrically couple to sensors or outputs from respective ATSs and the sensors or outputs may indicate when a particular ATS needs to be bypassed. The bypass device may bypass the particular ATS in response to receiving the indication. In some embodiments, a bypass device may be controlled via network commands via an interface, such as interface 260.

Figure 3:
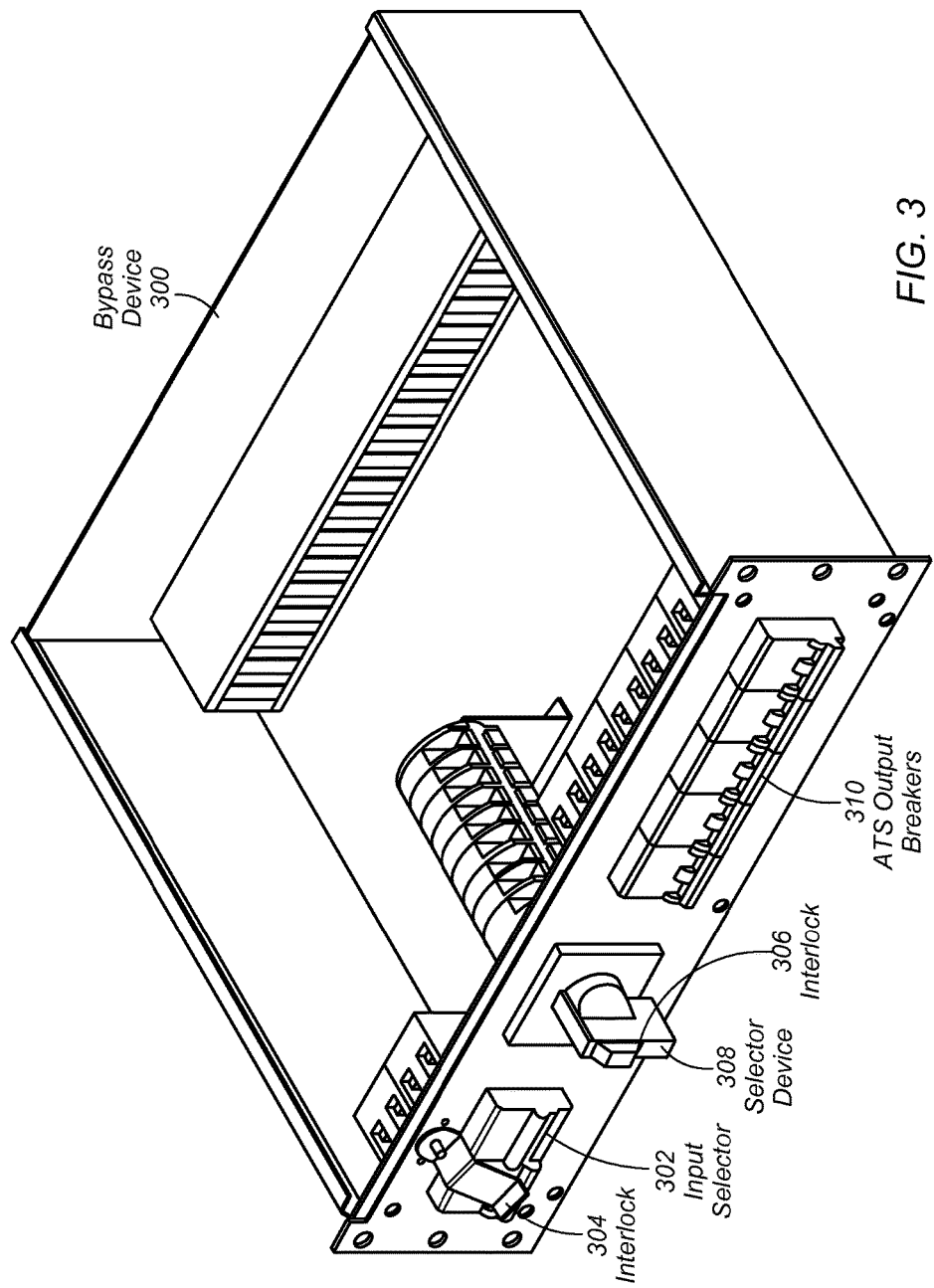
FIG. 3 is a view of a bypass device according to some embodiments.

FIG. 3 is a view of a bypass device according to some embodiments. A bypass device, such as bypass device 300 depicted in FIG. 3, may fit into an automatic transfer switch cabinet (depicted in FIG. 4) and be serviceable from a front side of the automatic transfer switch cabinet without requiring any interaction with a back side of the bypass device. A bypass device may include an input selector, such as input selector 302, to select between a primary and secondary power source. An input selector may be a single switch to align a single power source or may include a selection between multiple power sources. An input selector may include an interlock, such as interlock 304 to prevent simultaneously aligning a primary power source and a secondary power source to the bypass device. An interlock, such as interlock 304, may also ensure that a switch such as a switch of input selector 302 is not inadvertently switched to a different position by providing a physical barrier to prevent operation of the switch. In FIG. 3 an input selector with a particular type of interlock is depicted. In some embodiments other types of switches may be used as input selector and different types of interlocks may be used to prevent inadvertently changing the position of an input selector or inadvertently selecting more than one input power source at a time. A bypass device, such as bypass device 300, may also include a selector device. The input selector, selector device and ATS output breakers may all be on the front side of a bypass device so that automatic transfer switches associated with the bypass device can be bypassed from a front side of the bypass device without any interaction with a backside of the bypass device or switches in other locations. In FIG. 3, a rotary selector device is illustrated. In some embodiments, other types of selector devices may be used including an array of switches, a user interface, and other well-known systems for selectively coupling an input with a chosen one of a plurality of outputs. In some embodiments a selector device may include an interlock to ensure the selector device is not inadvertently rotated to a different selection. For example, selector device 308 includes interlock 306. Interlock 306 may be a spring loaded button mechanism that prevents selector device 308 from being rotated unless interlock 306 is fully depressed.

A bypass device, such as bypass device 300, may include output breakers that can be used to selectively electrically isolate an automatic transfer switch. For example, output breakers 310 may include output breakers 178, 180, and 182 described in FIG. 1. In FIG. 3, output breakers 310 are depicted to comprise five breakers. In some embodiments, output breakers may include any number of breakers wherein each output breaker corresponds to a particular output connection of an outlet from a particular ATS.

Figure 4:
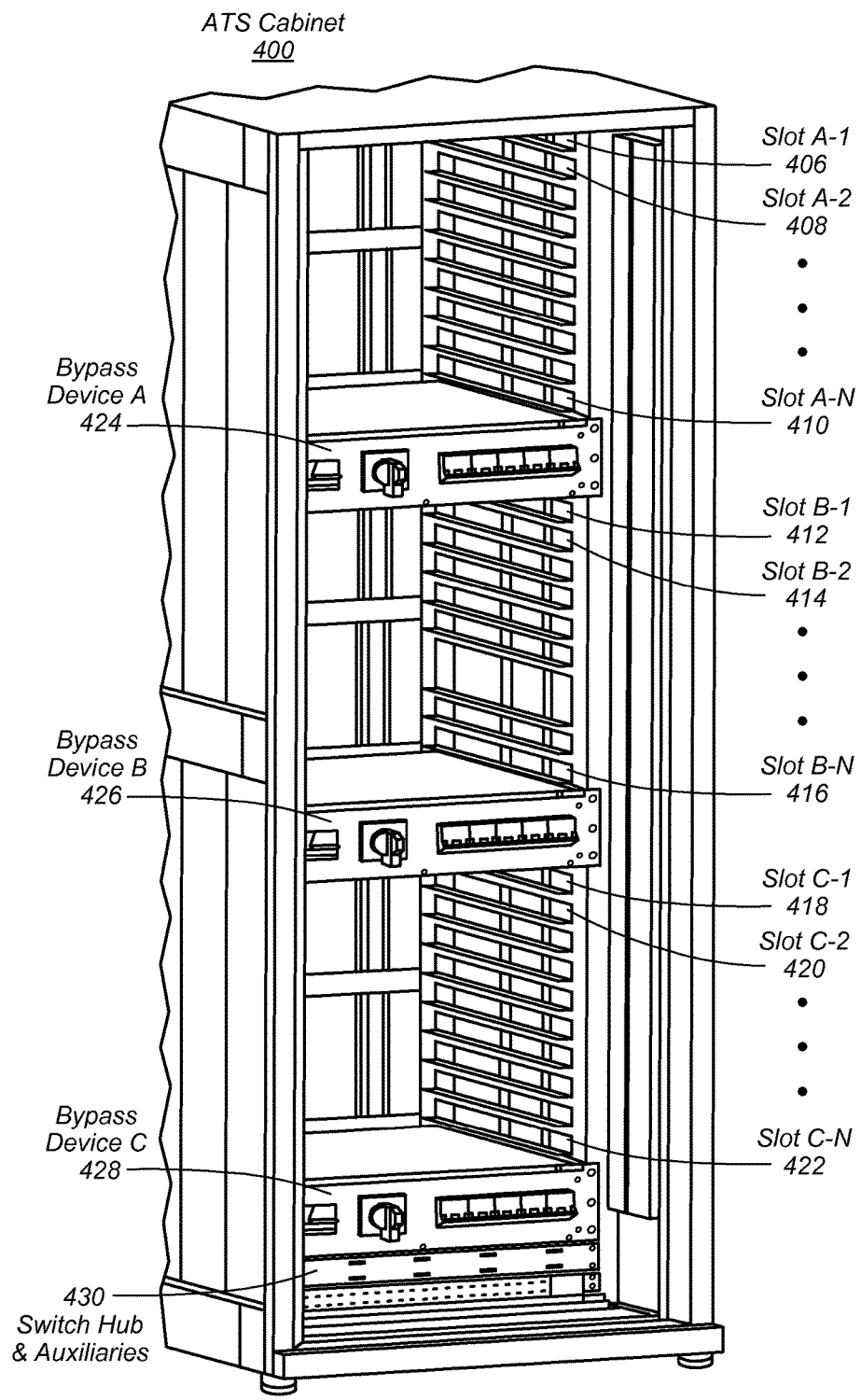
FIG. 4 is a view of an automatic transfer switch cabinet according to some embodiments.

FIG. 4 is a view of an automatic transfer switch cabinet according to some embodiments. ATS cabinet 400 may be an ATS cabinet 130 depicted in FIG. 1 or may be an ATS cabinet 200 depicted in FIG. 2. Bypass devices 424, 426, and 428 may be a bypass device 300 depicted in FIG. 3, a bypass device 144 depicted in FIG. 1, or bypass devices 212, 224, and 236 depicted in FIG. 2.

An automatic transfer switch cabinet may include multiple slots each configured to receive an automatic transfer switch and may include one or more bypass devices physically coupled to a set of slots of the automatic transfer switch cabinet. For example, ATS cabinet 400 includes slot "A-1" 406, slot "A-2" 408 and slot "A-N" 410 associated with bypass device "A" 424. Slot "A-2" 408 and slot "A-N" 410 are separated by a set of ellipses dots to indicate that ATS cabinet 400 may include more slots between slot "A-2" 408 and slot "A-N" 410 that are associated with bypass device "A" 424. Likewise ATS cabinet 400 includes slot "B-1" 412, slot "B-2" 414, and up to slot "B-N" 416 associated with bypass device "B" 426. And slot "C-1" 418, slot "C-2" 420 up to slot "C-N" 422 associated with bypass device "C".

The slots of an automatic transfer switch may be configured to accept an automatic transfer switch and allow removal of an automatic transfer switch from a front side of the automatic transfer switch cabinet without any interaction with a backside of the automatic transfer switch cabinet. This configuration may prevent data center personnel from being required to enter a hot aisle, because all interactions can be conducted from the front of the bypass device that faces a cold aisle. For example, slot "A-1" 406 of ATS cabinet 406 may accept an automatic transfer switch from the front side of ATS cabinet 406 without any interaction with a backside of ATS cabinet 406.

In some embodiments, an automatic transfer switch cabinet, such as ATS 400 may include one or more bus bars (not illustrated) to distribute electrical power to automatic transfer switches mounted in slots of the automatic transfer switch cabinet and to one or more bypass devices mounted in the automatic transfer switch cabinet. A bus bar may be connected to a blind mate connector that is configured to align with a corresponding blind mate connector on the rear of an automatic transfer switch. The blind mate connector may be coupled to a bus bar in the rear of an automatic transfer switch cabinet, such as ATS cabinet 400. And, may self-align with and couple to a blind mate connector on the rear of an automatic transfer switch, when the automatic transfer switch is mounted in a slot of an automatic transfer switch cabinet, such as ATS cabinet 400.

In some embodiments, a bypass device may be configured to provide electrical power to components in an automatic transfer switch cabinet that receive electrical power from a particular automatic transfer switch in the automatic transfer switch cabinet. For example, an automatic transfer switch cabinet, such as ATS cabinet 400 may include auxiliaries such as fans and a switch hub, for example switch hub and auxiliaries 430. The auxiliaries may be electrically coupled to an automatic transfer switch downstream of an output breaker such that the auxiliaries share a power feed with the loads associated with the particular ATS. Because the auxiliaries, such as switch hub and auxiliaries 430 share a power feed with the loads associated with the particular ATS, using a bypass device, for example bypass device "C" 428 to bypass the particular ATS and provide continuous electrical support to the loads associated with the particular ATS will also provide continuous electrical support to the auxiliaries such as switch hub and auxiliaries 430.

Figure 5:
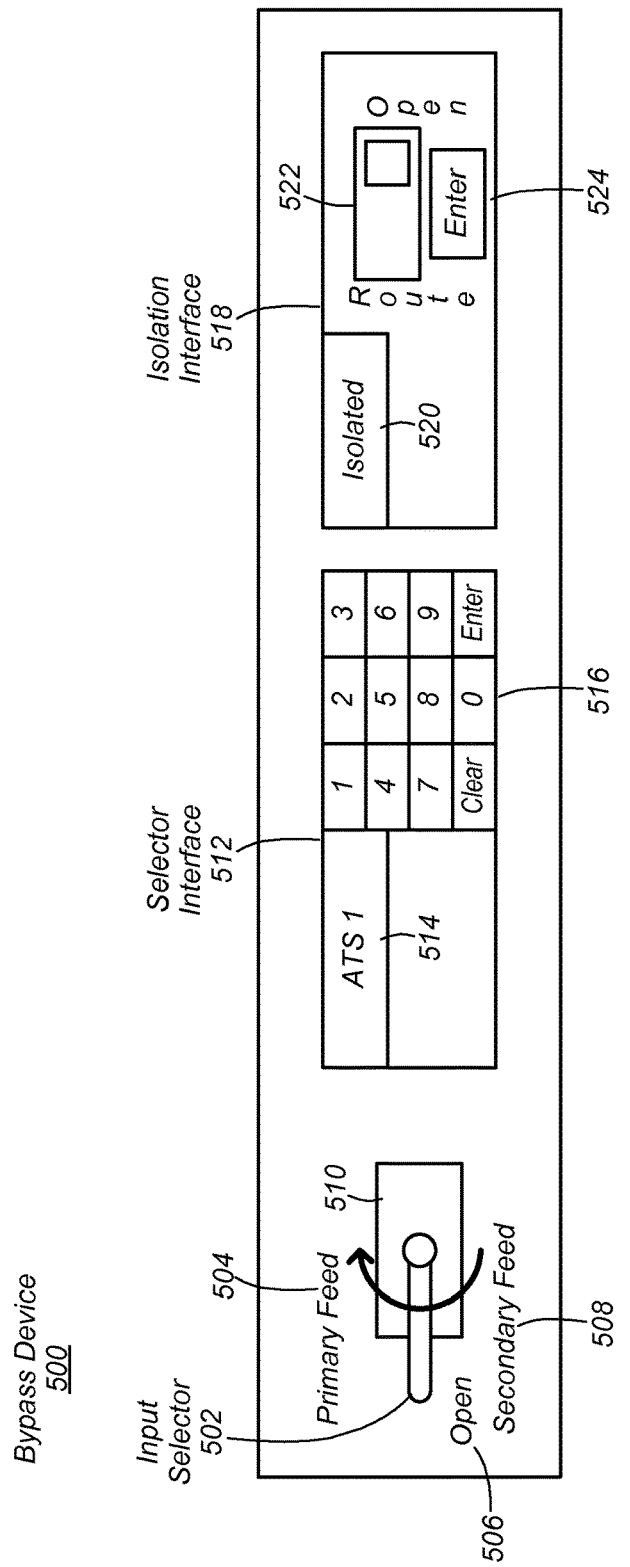
FIG. 5 is a view of a bypass device according to some embodiments.

FIG. 5 is a view of a bypass device according to some embodiments. A bypass device may include an interface for selecting an ATS to bypass, an interface for selecting an input power source to use for bypassing the selected ATS, and an interface for isolating the bypassed automatic transfer switch. For example, bypass device 500 includes input selector 502, selector interface 512, and isolation interface 518. FIG. 5 is an example interface. Other interfaces may be used to implement a bypass device. An input selector, such as input selector, 502 may allow a selection between input power sources and an open selection where no input power sources are aligned to the bypass device. For example, input selector 502 includes a lever that has a center position of open 506 and can be rotated up to a primary feed position 504 to select to feed electrical power from a primary power source. And, a secondary feed position 508, where the lever 510 can be rotated downward to select to feed electrical power from a secondary power system.

A bypass device may also include a selector interface, such as selector interface 512, for indicating a particular automatic transfer switch or a particular set of automatic transfer switches that are to be bypassed. A selector interface, may include a key pad, such as key pad 516, to enter an indication into the selector interface. And, may include a display, such as display 514 to indicate that a selected ATS is aligned to be bypassed. In some embodiments, a selector interface may be configured to display an error message. For example, if a selection of a particular ATS is entered into a selector interface while the input selector is aligned to feed electrical power from a primary power feed or a secondary power feed, an error message may be returned and the bypass device may not change the alignment of an ATS to be bypassed. A bypass device, such as bypass device 500 may include safety interlocks that prevent changing alignments from one ATS outlet connection to another while a bypass circuit is energized, i.e. the input selector is aligned to feed from a primary power system or a secondary power system.

A bypass device, such as bypass device 500, may include an isolation interface, such as isolation interface 518. An isolation interface may allow a bypassed to be ATS to be isolated after the ATS to be bypassed is entered into a selector interface and an input power source is selected via an input selector. An isolation interface may include a selector switch to select between isolate and route. An isolation interface may cause an output breaker, such as output breakers 178, 180, and 182 depicted in FIG. 1 to open (i.e. isolate) in order to isolate an outlet of a particular automatic transfer switch. An isolation interface may include a selector such as selector 522, a display to indicate the current position, such as display 520, and an execute button, such as enter button 524 to cause the output breaker to open. In some embodiments, a bypass device, such as bypass device 500 may include additional interlocks that must be satisfied before a display, such as display 520, indicates that an automatic transfer switch is isolated. For example, a bypass device may verify that the selected input power source corresponds to the power source currently feeding the ATS selected to be bypassed. In some embodiments, if the input power source selected via an input selector does not correspond with the input power source currently feeding the ATS selected to be bypassed, a display of the bypass interface, such as display 520 may display an error message and the output breaker may not open in response to receiving an execution command.

In some embodiments, an input selector, selector interface, and isolation interface may be combined into a single interface. In some embodiments, a bypass device may have a single interface to indicate an ATS that is to be bypassed and the bypass device may determine the appropriate input power source and open a corresponding output breaker after determining the indicated ATS is aligned to be bypassed and the correct input power source is aligned to feed a bypass circuit. In some embodiments, a bypass device may not include a user interface for entering commands and may receive commands via a network connection. In some embodiments, a bypass device may include both a user interface and a network interface for receiving commands via a network connection. In some embodiments a bypass device may receive commands from ATSs in an ATS cabinet without the commands being transmitted over a network.

In some embodiments, other well-known interface designs may be used.

Figure 6:
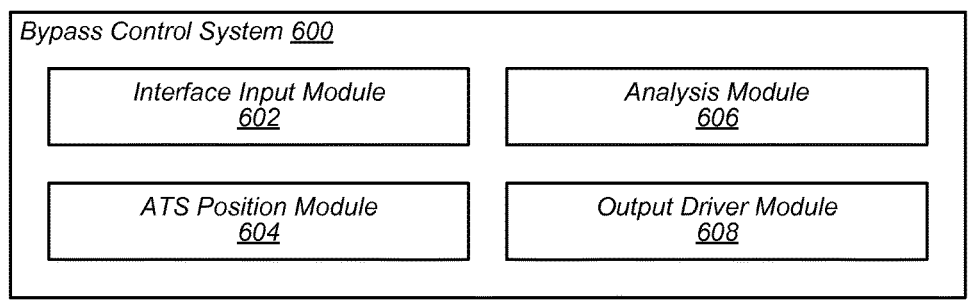
FIG. 6 is a schematic illustrating a bypass device control system according to some embodiments.

FIG. 6 is a schematic illustrating a bypass device control system according to some embodiments. A bypass control system, such as bypass control system 600, may include an interface input module, an ATS position module, an analysis module, and an output driver module. For example bypass control system 600 includes interface input module 602, ATS position module 604, analysis module 606, and output driver module 608.

An interface input module, such as input interface module 602, may receive input from an input selector and a selector device such as input selector 146 and selector device 148 in FIG. 1; input selectors 214, 226, 238 and selector devices 216, 228, and 240 in FIG. 2; input selector 302, selector device 308, and output breakers 310 in FIG. 3; and input selector 502, selector interface 512, and bypass interface 518 in FIG. 5. An interface input module 602 may communicate with analysis module 606 to indicate a received selection of an ATS to be bypassed. An interface input module 602 may in combination with ATS position module 604 communicate a current alignment of an input selector (e.g. open, primary power feed, secondary power feed).

An ATS position module, such as ATS position module 604, may track and/or determine a current position of a rotary switch or an array of switches that are configured to selectively align an output of an input selector with an outlet of a particular ATS via an ATS output connection in order to form an ATS bypass circuit. The ATS position module 604 may communicate the current position of the rotary switch or switch array to an analysis module, such as analysis module 606. An ATS position module may also receive signals from an ATS indicating a current state of an ATS. The signals may be received from an ATS via an interface of the bypass device. For example, an ATS may be configured to determine when the ATS faults or is likely to fault and may send a signal to a bypass device interface. An ATS position module may receive the signal and send a message to an ATS analysis module to determine if the bypass device should automatically bypass the ATS that sent the signal.

An analysis module, such as analysis module 606, may determine if an input selector is properly aligned before allowing a rotary switch or switch array to change a current alignment of the rotary switch or switch array. In some embodiments, an automatic transfer switch cabinet may include a single interface that controls multiple bypass devices. For example, an automatic transfer switch cabinet 200 may include a single interface and an analysis module may determine the appropriate bypass device to operate in order to bypass a particular ATS. An analysis module 606 may also determine that the input power selected via an input selector corresponds to the input power currently feeding an ATS to be bypassed before allowing an output breaker associated with the ATS to be opened to complete a bypass circuit. An analysis module 606 may send signals to an output driver module based on determinations regarding whether a rotary switch or switch array may be changed, regarding selection of an input power source, and regarding opening an output breaker. An analysis module 606 may be configured to generate an error message if one or more safety interlocks are not in compliance in response to a command. In some embodiments, an analysis module may process signals from ATSs that indicate possible faults and an analysis module may determine to automatically initiate a bypass of a distressed ATS based on the signals received from the ATS. In some embodiments, a bypass device may automatically bypass and isolate a faulty ATS and send a notification to operations personnel of the faulty ATS. In some embodiments, the signal indicating a faulty ATS may come directly from the ATS or via a network connection to the ATS.

An output driver module, such as output driver module 608, may receive signals from an analysis module, such as analysis module 606 and may cause one or more switches or rotary switches to operate. For example, an output driver module may receive a signal indicating an input selector should be switched from a primary power source to an open position. In response, the output driver module may cause one or more mechanisms to cause the input selector switch to change position. An output driver module may also receive a signal from an analysis module, such as analysis module 606 indicating that a rotary switch should be rotated to align a particular ATS to be bypassed and in response may cause a mechanism to rotate the rotary switch. An output driver module may also receive a signal from an analysis module, such as analysis module 606, to open one or more output breakers. The output driver module 608 may in response to receiving the signal cause one or more mechanisms to open the output breakers.

FIG. 6 describes modules that may comprise a bypass control system. In some embodiments, any of the modules described in FIG. 6 may be performed mechanically or manually. For example, ATS position module 604 may comprise a rotary switch that is manually rotated by a person interacting with a bypass device.

Figure 7:
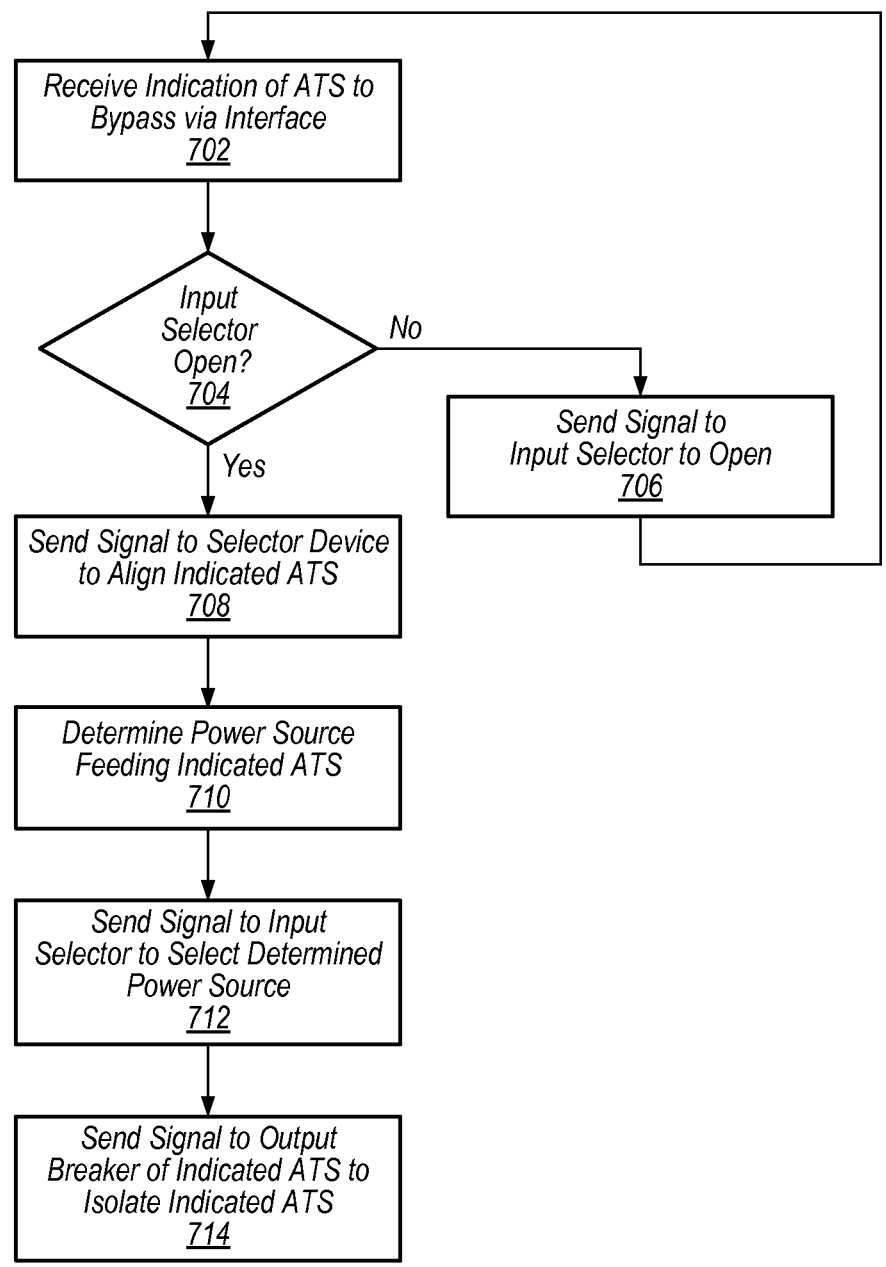
FIG. 7 is a flow diagram illustrating operation of a bypass device according to some embodiments.

FIG. 7 is a flow diagram illustrating operation of a bypass device according to some embodiments. A bypass control system, such as bypass control system 600 described in FIG. 6 may operate according to the steps described in FIG. 7. At step 702, an indication of an ATS to be bypassed is received via an interface. For example, an interface such as selector device 148 of FIG. 1; selector devices 216, 228, and 240 of FIG. 2 or interface 260 of FIG. 2; selector device 308 of FIG. 3, and selector interface 512 of FIG. 5 may receive indication of an ATS to be bypassed.

At step 704, the bypass control system determines if the input selector is currently set to open. Rotating a rotary switch while the input selector is currently aligned to a live power feed, for example a primary power system or a secondary power system may cause damage to the bypass device and equipment coupled to the bypass device. Therefore, the bypass control system ensures that there is not a live power feed connected to the bypass device while rotating the rotary device to a particular position to bypass a particular ATS. At step 706, if the input selector is not currently in the open position, the bypass control system sends a signal to switch the input selector to the open position.

At step 708, in response to verifying that the input selector is in the open position, the bypass control system sends a signal to a switching mechanism to align a selector device to the indicated ATS that is to be bypassed. For example, the bypass control system may cause a rotary switch to rotate to the position that aligns the rotary switch to bypass the indicated ATS to be bypassed. In some embodiments, the rotary switch or switch array may be operated manually. In some embodiments, the rotary switch or switch array may be operated automatically in response to the signal from the bypass control device.

At step 710, the power source feeding the ATS indicated to be bypassed is determined. In some embodiments, the bypass device may include connections to one or more indicators to determine the power source currently feeding the ATS indicated to be bypassed. In some embodiments, the power source currently feeding the ATS to be bypassed may be determined manually.

At step 712, the bypass control system sends a signal to the input selector to select the input power source determined to be currently feeding the ATS to be bypassed. In some embodiments the bypass control system may automatically cause the determined input power source to be selected via the selector device. In some embodiments, the selector device may be manually operated to select the determined input power source.

At step 714, the bypass control system sends a signal to the output breaker corresponding to the indicated ATS to open thus isolating the bypassed ATS and feeding electrical power to the one or more loads associated with the ATS to be bypassed via the bypass device.

Figure 8:
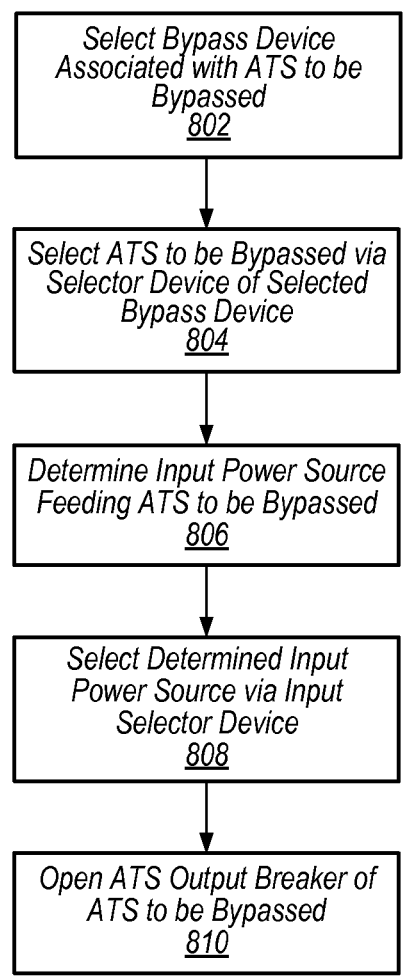
FIG. 8 is a flow diagram illustrating bypassing an automatic transfer switch according to some embodiments.

FIG. 8 is a flow diagram illustrating bypassing an automatic transfer switch according to some embodiments. The steps described in FIG. 8 may be performed by a bypass control system, such as bypass control system 600 described in FIG. 6 or may be performed manually. At step 802, a bypass device associated with the ATS to be bypassed is selected. For example, an automatic transfer switch cabinet, such as ATS cabinet 200 may comprise multiple bypass devices, wherein each bypass device is associated with a set of automatic transfer switches. As another example, an ATS such as an ATS in slot "A-1" of FIG. 4 may be the ATS to be bypassed. A determination is made as to which bypass device corresponds to an ATS in slot "A-1". For example, in FIG. 4 bypass device "A" corresponds to an ATS in slot "A-1".

At step 804, after selecting the bypass device that corresponds to the ATS to be bypassed, the ATS to be bypassed is selected via an interface of the determined bypass device. For example, an interface, such as a rotary switch may be rotated to select a particular ATS to be bypassed. In some embodiments an interface may include a keypad to indicate an ATS to be bypassed. In some embodiments, more than one ATS may be bypassed at the same time.

At step 806, an input power source that is currently feeding the ATS to be bypassed is determined. In some embodiments, an indicator on the ATS to be bypassed may provide a manual indication of the power source currently feeding the ATS to be bypassed. In some embodiments, a sensor may be coupled to each ATS and may communicate with a bypass control system to indicate the power source currently feeding an ATS to be bypassed. In some embodiments, a bypass device may receive input power from a single input power source such that the input power source does not need to be determined. For example, an ATS cabinet may have multiple bypass devices that each receive power in a different phase than other ATSs in the same cabinet. Each bypass device may comprise a single input power source of the particular phase fed to the automatic transfer switches associated with the particular bypass device. In some embodiments, the bypass device may share an input power source with the ATSs coupled to the bypass device.

At step 808, the determined input power source is selected via an input selector device. In some embodiments, the input selector device may be manually operated. In some embodiments, a bypass control system may send a signal to one or more actuators to cause the determined input power source to be selected via an input selector device.

At step 810, an output breaker associated with the ATS to be bypassed is opened. In some embodiments, a bypass device may not include an output breaker and selecting the input power source may complete the bypass circuit to the outlet of the ATS to be bypassed. In some embodiments, the output breaker may be manually opened. In some embodiments a bypass control system may cause one or more actuators to open the output breaker. Once the output breaker is opened, there is a complete bypass circuit from the selected input power source to the loads associated with the ATS to be bypassed via the bypass device and the ATS to be bypassed is isolated on the outlet side. Electrical power is routed from the selected input power source to the selector device and from the selector device to the ATS output connection.

Figure 9:
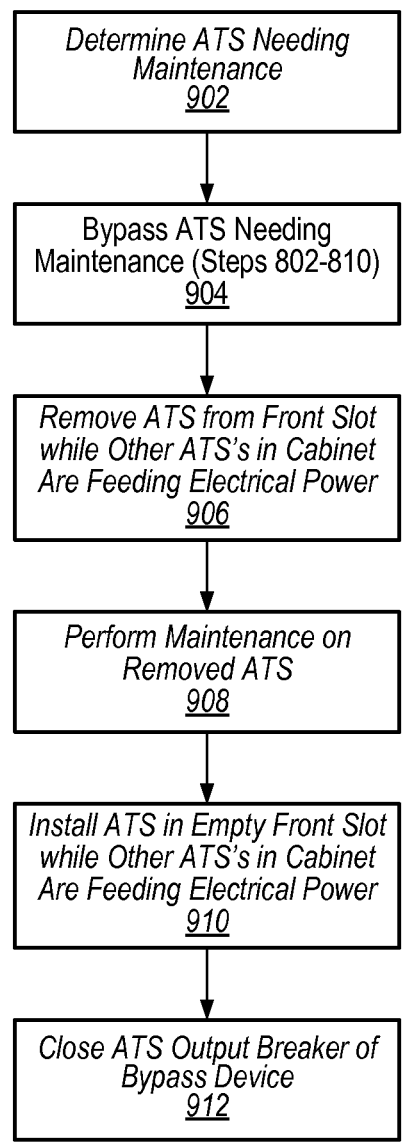
FIG. 9 is a flow diagram illustrating removing and installing an automatic transfer switch using a bypass device, according to some embodiments.

FIG. 9 is a flow diagram illustrating removing and installing an automatic transfer switch using a bypass device, according to some embodiments. The steps described in FIG. 9 may be performed in part manually and in part by a bypass control system. At step 902, a determination is made that an ATS needs to have maintenance performed. For example, a loss of primary power may have caused an ATS to attempt to switch to a secondary power source, and the ATS may have failed to switch over to the secondary power source. In another example, an ATS may be scheduled to have preventative maintenance performed.

At step 904, the ATS is bypassed as described in steps 802-812 of FIG. 8.

At step 906, after the ATS to be bypassed is isolated in step 812, the bypassed ATS is removed from the ATS cabinet while electrical power is being fed through other ATSs mounted in the ATS cabinet and while electrical power is being fed to the loads associated with the bypassed ATS via the bypass device.

At step 908, maintenance is performed on the removed ATS. For example, corroded contactors on the ATS switch may be replaced, or any other type of maintenance may be performed. In some embodiments, the bypassed ATS may be removed for inspection without maintenance being performed. In some embodiments, a replacement ATS may be selected without performing any maintenance on the removed bypassed ATS.

At step 910, the repaired removed ATS or a replacement ATS is installed in the slot from which the bypassed ATS was removed while electrical power is fed through other ATSs in the cabinet and electrical power is fed to the one or more loads associated with the bypassed ATS slot via the bypass device.

At step 912, the output breaker associated with the slot the ATS was installed in is closed, thus routing electrical power to the one or more loads via the installed ATS.

Figure 10:
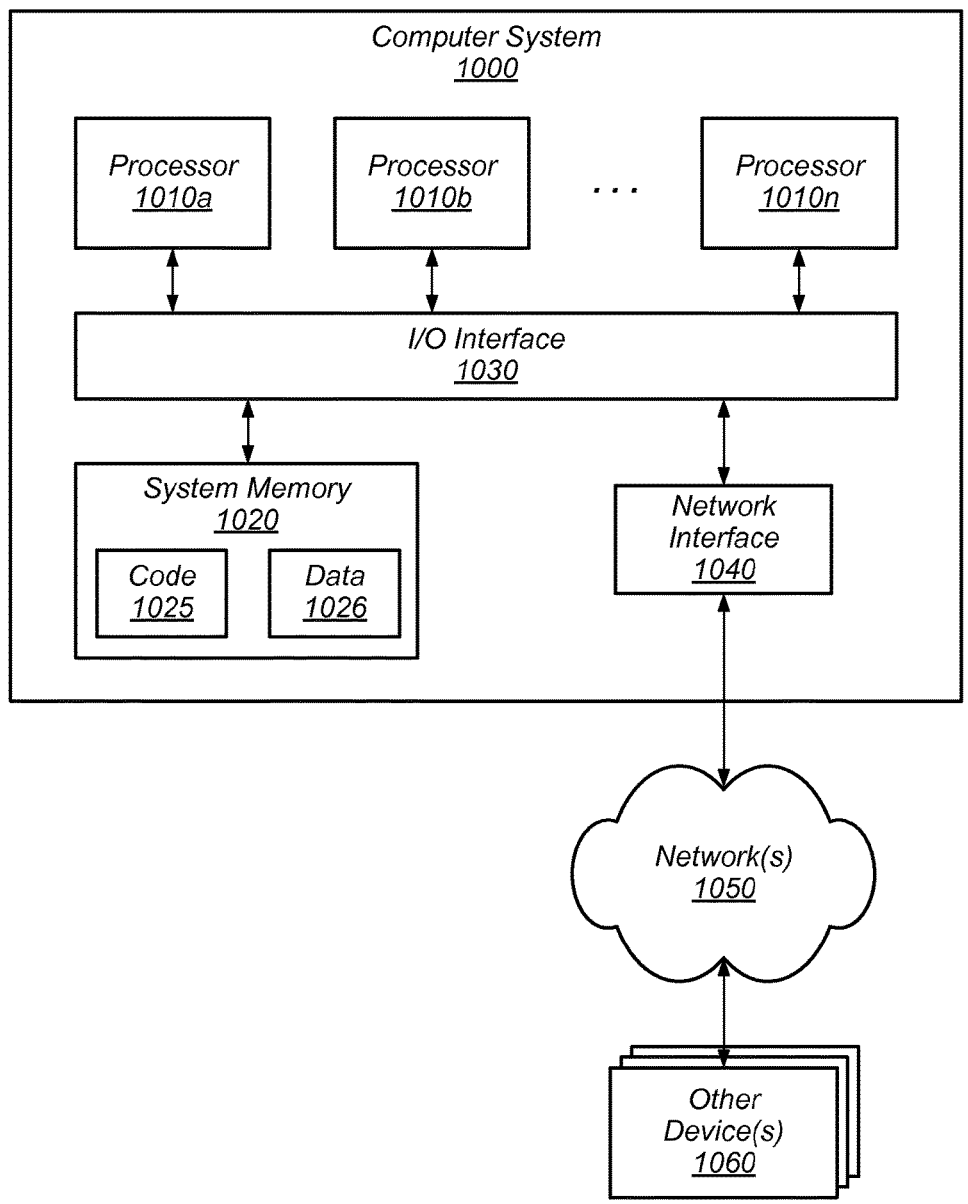
FIG. 10 is a block diagram illustrating an example computer system that may be used in some embodiments.

FIG. 10 is a block diagram illustrating an example computer system that may be used in some embodiments.

In some embodiments, a system that implements a portion or all of one or more of the technologies, including but not limited to a portion or all of the bypass device, systems and components associated with the bypass device, and various methods, systems, components, devices, and apparatuses as described herein, may include a general-purpose computer system that includes or is configured to access one or more computer-accessible media, such as computer system 1000 illustrated in FIG. 10. In some embodiments the one or more loads in the data center may comprise a computer system such as computer system 1000. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of one or more of the technologies, including but not limited to a portion or all of the bypass device, systems and components associated with the bypass device, and various methods, systems, components, devices, and apparatuses as described herein, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data for implementing embodiments of methods as described above relative to FIGS. 1-9. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
    an automatic transfer switch cabinet comprising:
        a plurality of automatic transfer switches, each automatic transfer switch of the plurality of automatic transfer switches configured to selectively switch an electrical power feed between a plurality of input power sources and feed electrical power from one of the plurality of input power sources to one or more loads in the data center via an output connection of a plurality of output connections of a bypass device, wherein respective ones of the output connections of the bypass device are associated with respective ones of the automatic transfer switches; and
        the bypass device, wherein the bypass device is physically coupled to at least one of the plurality of input power sources and is configured to selectively feed electrical power to one or more loads of the one or more loads in the data center that are associated with a limited selection of automatic transfer switches to be bypassed of the plurality of automatic transfer switches, wherein the limited selection is less than all of the plurality of automatic transfer switches;
        wherein the bypass device comprises:
            a selector device configured to selectively route power from at least one of the plurality of input power sources to respective output connections associated with the limited selection of automatic transfer switches such that the selectively routed power bypasses the limited selection of automatic transfer switches and is fed to the one or more loads associated with the limited selection of automatic transfer switches; and
            a plurality of output breakers, wherein respective ones of the plurality of output breakers are coupled to respective separate power outlets of each of the plurality of automatic transfer switches, and wherein each output breaker is configured to selectively electrically isolate a respective automatic transfer switch from the respective output connection associated with the respective automatic transfer switch.

2. The data center of claim 1, wherein the bypass device further comprises:
    an input selector coupled to the plurality of input power sources and configured to selectively electrically couple respective ones of the plurality of input power sources to the selector device.

3. The data center of claim 1, wherein the plurality of automatic transfer switches comprises:
    a plurality of groups of automatic transfer switches, wherein a particular group of the plurality of groups is configured to selectively feed electrical power of a particular phase from one of the plurality of input power sources to a group of the one or more loads in the data center via respective output connections associated with the automatic transfer switches of the particular group, wherein the particular phase of electrical power fed by the particular group of automatic transfer switches is different from one or more other phases of electrical power fed by one or more other groups of the plurality of groups of automatic transfer switches; and wherein the automatic transfer switch cabinet further comprises:

one or more additional bypass devices, wherein individual ones of the one or more additional bypass devices are coupled to the respective power outlets of each of the automatic transfer switches of an individual respective group of automatic transfer switches of the plurality of groups of automatic transfer switches.

4. The data center of claim 1, wherein the automatic transfer switch cabinet further comprises:

a plurality of slots each configured to accept one of the plurality of automatic transfer switches;

wherein each slot comprises a set of electrical connectors configured to electrically couple an automatic transfer switch accepted into the respective slot to one of the respective output connections of the bypass device;

wherein the automatic transfer switch cabinet is configured to accept an additional automatic transfer switch in an empty slot of the automatic transfer switch cabinet while electrical power is being fed to the one or more loads in the data center via the plurality of automatic transfer switches.

5. A bypass device, comprising:

a plurality of automatic transfer switch connectors configured to electrically couple the bypass device to respective outlets of each of a plurality of automatic transfer switches, wherein each automatic transfer switch of the plurality of automatic transfer switches is configured to selectively switch an electrical power feed between a plurality of input feeds and feed electrical power from one of the plurality of input feeds to one or more loads via an output connection of a plurality of output connections of the bypass device;

at least one input connector configured to electrically couple the bypass device to at least one input power source;

a plurality of output connectors configured to electrically couple respective output connections of the bypass device to the one or more loads; and a selector device configured to selectively route power from the at least one input power source to respective output connections associated with a limited selection of automatic transfer switches to be bypassed of the plurality of automatic transfer switches, wherein the limited selection is less than all of the plurality of automatic transfer switches;

wherein to bypass the limited selection of automatic transfer switches, the bypass device is configured to electrically isolate the limited selection of automatic transfer switches to be bypassed and route power from the at least one input power source to the respective output connections associated with the limited selection of automatic transfer switches to be bypassed such that the routed power bypasses the limited selection of automatic transfer switches; and wherein the bypass device is mountable in an automatic transfer switch cabinet from a front side of the automatic transfer switch cabinet, and wherein the bypass device is configured to bypass the limited selection of automatic transfer switches without manual interaction with a backside of the automatic transfer switch cabinet.

6. The bypass device of claim 5, wherein the bypass device further comprises:

an input selector coupled to a plurality of input connectors of the at least one input connector, wherein each input connector is configured to electrically couple with a separate input power source of the at least one input power source and wherein the input selector is configured to selectively route electrical power from a respective one of a plurality of input power sources of the at least one input power source to the selector device via a selected input connector.

7. The bypass device of claim 5, further comprising:

a plurality of output breakers configured to electrically isolate the limited selection of automatic transfer switches to be bypassed, wherein respective ones of the plurality of output breakers are coupled to respective separate power outlets of each of the plurality of automatic transfer switches, and wherein each output breaker is configured to selectively electrically isolate a respective automatic transfer switch from the respective output connection associated with the respective automatic transfer switch.

8. The bypass device of claim 5, wherein the selector device comprises a rotary switch configured to be rotated to selectivity electrically couple the at least one of the input power sources to the output connection associated with a selected individual automatic transfer switch, such that electrical power is selectively routed from the at least one input power source to the output connection associated with the selected individual automatic transfer switch via the rotary switch.

9. The bypass device of claim 5, wherein the selector device comprises an array of switches, wherein each switch in the array of switches is electrically coupled to an output connection associated with an individual automatic transfer switch connector of the plurality of automatic transfer switch connectors, and wherein one or more of the switches of the array of switches are configured to close to select the limited selection of automatic transfer switches to be bypassed.

10. The bypass device of claim 5, wherein the selector device comprises an interface, wherein the interface comprises a key pad, touch pad, touch-sensitive display, or network interface, and wherein the interface is configured to:

receive an identification of one or more automatic transfer switches to be bypassed; and in response to receiving the identification of the one or more automatic transfer switches to be bypassed, cause one or more switches, each electrically coupled to the at least one input connector and each electrically coupled to a respective output connection associated with an individual automatic transfer switch of the plurality of automatic transfer switches, to close to select the limited selection of automatic transfer switches to be bypassed.

11. The bypass device of claim 5, wherein the selector device is further configured to selectively route power from the at least one input power source to an output connection associated with a single automatic transfer switch to be bypassed, and wherein the bypass device is further configured to bypass the single automatic transfer switch.

12. The bypass device of claim 5, wherein the bypass device further comprises a plurality of signal connectors configured to transmit a signal to a plurality of latch mechanisms of the automatic transfer switch cabinet, wherein the latch mechanisms latch automatic transfer switches to the automatic transfer switch cabinet and release upon receiving the signal from the bypass device via the signal connectors indicating that one or more particular automatic transfer switches is being bypassed.

13. The bypass device of claim 5, wherein the bypass device is configured to allow the limited selection of automatic transfer switches to be bypassed to be removed from the front side of the automatic transfer switch cabinet without interaction with the backside of the automatic transfer switch cabinet.

14. The bypass device of claim 5, wherein, the bypass device is configured to electrically couple to the respective outlets of each of the plurality of automatic transfer switches via a connector of a slot of a plurality of slots in an automatic transfer switch cabinet, and wherein the bypass device is configured to electrically couple to at least one particular connector of at least one slot of the automatic transfer switch cabinet that is an empty slot that does not comprise an automatic transfer switch.

15. The bypass device of claim 5, wherein the at least one input power connector is configured to connect to a bus bar power source.

16. The bypass device of claim 5, wherein:
the bypass device is configured to receive an indication of the limited selection of automatic transfer switches from an interface on a front side of the bypass device independently of any interaction with a backside of the bypass device.

17. The bypass device of claim 5, further comprising:
an interface configured to receive an input signal from one or more of a plurality of automatic transfer switches electrically coupled to the bypass device, wherein the input signal indicates that one or more particular automatic transfer switches of the plurality of automatic transfer switches are to be bypassed.

18. A method, comprising:
selecting, via a selector device of a bypass device, one or more automatic transfer switches to bypass of a plurality of automatic transfer switches, wherein the bypass device is physically coupled to at least one input power source and physically coupled to respective outlets of each respective automatic transfer switch of the plurality of automatic transfer switches via respective output connections of the bypass device, wherein the one or more automatic transfer switches selected to be bypassed is less than all of the plurality of automatic transfer switches physically coupled to the bypass device, and wherein the automatic transfer switches are configured to selectively switch between respective ones of a plurality of input power feeds;
selecting, via an input selector of the bypass device, an input power source of the at least one input power source to feed electrical power to one or more respective output connections of the bypass device associated with the one or more automatic transfer switches selected to be bypassed; and
isolating, via an isolation interface of the bypass device, the one or more automatic transfer switches selected to be bypassed, wherein electrical power from the selected input power source continues to flow to one or more loads associated with the one or more automatic transfer switches selected to be bypassed via the one or more respective output connections of the bypass device associated with the one or more automatic transfer switches selected to be bypassed.

19. The method of claim 18, wherein the at least one input power source comprises a primary power source and a secondary power source; and wherein said selecting, via the input selector of the bypass device, an input power source of the at least one input power sources further comprises:
selecting, via the input selector, one of the primary power source or the secondary power source to feed electrical power to the one or more respective output connections of the bypass device associated with the one or more automatic transfer switches selected to be bypassed.

20. The method of claim 18, wherein each of the plurality of automatic transfer switches are mounted in separate slots in an automatic transfer switch cabinet; wherein the plurality of automatic transfer switches are each configured to be removably mounted in the separate slots via a front side of the automatic transfer switch independently of any manual interaction with a back side of the automatic transfer switch cabinet; and wherein the method further comprises:
while selectively routing electrical power to the one or more loads associated with the one or more automatic transfer switches selected to be bypassed via the selector device, removing at least one of the bypassed automatic transfer switches from a slot of the automatic transfer switch cabinet, via the front side of the automatic transfer switch cabinet.

21. The method of claim 20, further comprising:
installing, subsequent to the removing the at least one of the bypassed automatic transfer switches from the slot of the automatic transfer switch cabinet, a particular automatic transfer switch in the slot of the automatic transfer switch cabinet; and
routing via the isolation interface of the bypass device, subsequent to installing the particular automatic transfer switch in the slot of the automatic transfer switch cabinet, electrical power to one or more loads associated with the slot of the automatic transfer switch cabinet via the particular automatic transfer switch without routing electrical power to the one or more loads associated with the slot of the automatic transfer switch cabinet via the bypass device.

* * * * *